(12) United States Patent
Guice et al.

(10) Patent No.: US 9,295,245 B1
(45) Date of Patent: *Mar. 29, 2016

(54) AIRBORNE BIOTA MONITORING AND CONTROL SYSTEM

(71) Applicant: Applied Information Movement and Management, inc., Starkville, MS (US)

(72) Inventors: David L. Guice, Brownsboro, AL (US); Augustus Hammond Green, Jr., New Market, AL (US); William V. Dent, Jr., Huntsville, AL (US)

(*) Notice: Subject to any disclaimer, the term of this patent is extended or adjusted under 35 U.S.C. 154(b) by 351 days.

This patent is subject to a terminal disclaimer.

(21) Appl. No.: 13/847,143

(22) Filed: Mar. 19, 2013

Related U.S. Application Data (63) Continuation of application No. 11/978,424, filed on Oct. 29, 2007, now Pat. No. 8,400,348, and a continuation-in-part of application No. 11/054,685, filed on Feb. 8, 2005, now Pat. No. 7,501,979, and a continuation-in-part of application No. 10/721,112, filed on Nov. 25, 2003, now Pat. No. 6,853,328, and a continuation-in-part of application No. 09/571,295, filed on May 14, 2000, now Pat. No. 6,653,971.

(60) Provisional application No. 60/134,081, filed on May 14, 1999.

(51) Int. Cl.
*G01S 13/08* (2006.01)
*A01M 1/02* (2006.01)
*A01M 1/22* (2006.01)

(52) U.S. Cl.
CPC ............... *A01M 1/026* (2013.01); *A01M 1/226* (2013.01)

(58) Field of Classification Search
CPC ........ A01M 1/026; A01M 1/226; G01S 13/88

USPC ............... 342/27–28, 52–54, 56, 61, 90, 175; 43/132.1

See application file for complete search history.

(56) References Cited

U.S. PATENT DOCUMENTS

| 5,774,088 | A  | * | 6/1998  | Kreithen | A01K 15/02 342/22 |
| 6,313,643 | B1 | * | 11/2001 | Tirkel   | G01N 22/00 119/721 |
| 6,653,971 | B1 | * | 11/2003 | Guice    | A01M 1/026 342/22 |
| 7,501,979 | B1 | * | 3/2009  | Guice    | A01M 1/026 235/400 |
| 8,400,348 | B1 | * | 3/2013  | Guice    | A01M 1/026 235/400 |

* cited by examiner

*Primary Examiner* — John B Sotomayor
*Assistant Examiner* — Marcus Windrich
(74) *Attorney, Agent, or Firm* — Mark Clodfelter (57) ABSTRACT

Apparatus and methods for an airborne biota monitoring and control system are disclosed. Radar and laser/optical sensors are used to detect insects, with detection zones being over water in some embodiments to reduce backscatter clutter. A pest control laser or small autonomous or radio controlled aircraft under automated or human control may be used to disable a targeted flying insect. One embodiment includes use of a head-mounted display for displaying insect targeting information superimposed on a real landscape view. Technologies such as adaptive lens, holographic optical elements, polarized radar and/or laser beams, light amplifiers and light guides, thin disk, spinning disk, or vertical cavity surface emitting lasers enhance performance of the apparatus or reduce cost of the apparatus. Also disclosed are methods of discrimination of insect types using spectral information and dynamic relative variation of spectral intensities at different wavelengths reflected from an insect in flight.

23 Claims, 6 Drawing Sheets

AIRBORNE BIOTA MONITORING AND CONTROL SYSTEM

CROSS REFERENCE TO RELATED APPLICATIONS

This application is a continuation of Applicant's pending U.S. patent application Ser. No. 11/978,424, filed Oct. 29, 2007, now U.S. Pat. No. 8,400,348, issued Mar. 19, 2013, which is a continuation-in-part Applicant's U.S. patent application Ser. No. 11/054,685, filed Feb. 8, 2005, now U.S. Pat. No. 7,501,979, issued on Mar. 10, 2009, which is a continuation-in-part of U.S. patent application Ser. No. 10/721,112, filed Nov. 25, 2003, now U.S. Pat. No. 6,853,328, which issued on Feb. 8, 2005, which was a continuation-in-part of U.S. patent application Ser. No. 09/571,295, filed May 14, 2000, now U.S. Pat. No. 6,653,971 which issued Nov. 25, 2003, and which claimed the benefit of U.S. provisional patent application No. 60/134,081, filed May 14, 1999. The instant application hereby incorporates Applicants' U.S. Pat. No. 6,653,971, entitled "Airborne Biota Monitoring and Control System," herein by reference in its entirely, and also hereby incorporates Applicants' U.S. Pat. No. 6,853,328, also entitled "Airborne Biota Monitoring and Control System," herein by reference in its entirety. The instant application also hereby incorporates Applicants' U.S. patent application Ser. No. 11/054,685 and Applicants' provisional U.S. patent application No. 60/134,081 herein by reference in their entireties.

FIELD OF THE INVENTION

The systems, methods, and apparatus of the instant invention relate generally to monitoring and control of pest insects, and possibly other forms of airborne biota, and particularly to use of radars, ladars/lidars, and other sensors for detection and discrimination of pest insects from beneficial insects and other airborne biota, and use of lasers or other precision weapons including small radio-controlled aircraft for pest insect control. Some embodiments may include use of such technologies in conjunction with a video game or other entertainment application involving detection and control of pest insects. Systems, methods, and apparatus disclosed also provide for detection of pest insects or other pest activity within the protected volume using insect traps with miniaturized sensors and telemetry systems, and for detecting pest insect activity on or within crop plants or production animals using laser vibrometry and other laser and optical sensors.

BACKGROUND OF THE INVENTION

Applicants' prior U. S. patents and patent applications described problems associated with pest insects and other airborne biota and described apparatus and methods for protecting crops and other assets from insects and other airborne biota. The instant application describes additional embodiments and methods of use for some of the component elements and inventions described in Applicants' prior U. S. patents and patent applications, some of which may now become preferred embodiments, and expands upon methods, apparatus, configuration, and technologies that may be used with benefit in some embodiments, including embodiments of the instant invention wherein some functions of some elements may be controlled by human operators who may be located adjacent to or remotely from a location of sensors, processors, and weapons. In some embodiments, human operators located remotely or in a vicinity of a protected area or pest insects, or other area where sensors and weapons are deployed, may be presented with displays based upon sensor observations and may operate controls so as to cause weapons to engage targets deemed to be harmful or potentially harmful to protected assets.

For some applications where regions that may be used as boundary zones may be limited in width or in another dimension through which insects may fly in entering (or in some cases, in exiting) a protected area or volume or in simply flying from one location to another, it may be desirable to have available additional measurement capabilities to support more rapid detection, tracking, and/or discrimination techniques so that pest insects and other pests may be more rapidly identified within a shorter time and/or shorter distance of flight. For example, discrimination techniques that rely primarily on characteristics associated with wing beat frequencies may require observation of a flying insect during several wing beat cycles to obtain adequate confidence in identification. Additionally, some insects, particularly butterflies, may coast for extended periods without flapping their wings. Consequently, additional measurements including reflected spectral characteristics and other characteristics such as polarization scattering matrices (which may provide information, for example, on target length to width ratios, or body orientation in flight) may be desirable to support more rapid identification of pest insects with a level of confidence adequate to support a decision to engage targets identified as pest insects, or targets requiring control for other reasons. The potential use of measurements of spectral characteristics to support target identification, or discrimination of pest insects from beneficial or neutral insects, was disclosed in Applicants' earlier patents and patent applications. Additional information to support discrimination may include season and time of day, as disclosed in Applicant's incorporated U.S. Pat. No. 6,853,328 at the paragraph bridging cols. 20, 21, and FIG. 12. This application expands upon related but unobvious techniques that may also be applied to exploit dynamic characteristics of spectral information and other signatures that may be observed and/or measured.

The instant application also describes additional embodiments and/or features or technologies that may be incorporated with benefit in selected embodiments disclosed in Applicants' previous patents and patent applications, or in other embodiments that comprise obvious extensions of Applicants' instant and previous disclosures.

DETAILED DESCRIPTION OF THE DRAWINGS

Airborne biota monitoring and control systems disclosed in the instant application and in Applicants' prior U.S. patents and patent applications include potential use of radar and optical sensor technologies, including ladar/lidar technologies) for detection and classification as pest or non-pest of insects entering (and/or, in some embodiments, leaving) a crop field or other volume or region which may include a crop or other asset to be protected from pest insects or other pests. Although some embodiments of airborne biota monitoring and control systems for selected applications and markets may be implemented and perform adequately using only optical sensors without use of radar sensors, for many embodiments, the use of radar at one or more frequency ranges may be desirable since the longer wavelength of radars may provide information on an insects overall body characteristics (such as length to width ratios, body orientation during flight, or total body mass estimated from measured radar cross-section) that may be useful discriminants but may not be readily observable using only sensors operating at optical (including infrared) wavelengths. The use of radar as described in disclosures of various embodiments of airborne biota monitoring and control systems will generally require detection of airborne objects (primarily insects in many embodiments) having very low radar cross section (RCS) values in a vicinity of objects which have much larger RCS values. Since it is difficult in current antenna design art to design radar antennas in a way which completely eliminates angle sidelobes, the use of radar beams to illuminate and detect desired "targets" having very low cross sections in a vicinity of materials and objects having very large radar scattering properties (e.g., uneven soil surface, weeds, grass, trees, crop plants and other plants, fences, utility lines and support structures, buildings, vehicles) is a particular problem to be addressed in many embodiments of airborne biota monitoring and control systems. Although antennas may be designed so that gain in angle sidelobes in a particular direction or orientation is reduced by 30 dB or more relative to maximum gain in the main beam(s) of an antenna, if sidelobes illuminate materials at the same ranges as desired targets which have much greater backscattering properties (e.g., RCS values greater by 30 dB or more relative to desired insect targets), then backscattered energy received via angle sidelobes may substantially or completely obscure the energy backscattered from desired insect targets.

Thus, one area to be addressed in implementing many embodiments of airborne biota monitoring and control systems involves reducing or dealing with backscatter and reception of radar energy from various materials in or near a crop field or other environment via undesired "sidelobes" of radar antennas. This problem is generally known as radar clutter and is associated with a general problem, as noted above, of receiving radar energy from undesired scattering sources in main beam(s) of radar antennas or in angle sidelobes of an antenna gain pattern. "Clutter" returns from undesired scattering sources can reduce the signal-to-noise-plus-clutter ratio for many targets and thus obscure desired returns from intended targets. Clutter returns generally increase when a radar is operated such that a propagation direction of a main beam(s) of an antenna is generally horizontal and close to, or directly intercepts, materials such as a soil surface or vegetation which can backscatter more energy into a radar receiver (via a main beam, sidelobes, or combinations thereof) than energy from desired targets.

The clutter problem can generally be decomposed for practical discussion into:

(1) clutter returns resulting from illumination within main beam(s) of radar antenna of undesired scattering materials and reception of single-path and multi-path scattered energy therefrom via such main beam(s);

(2) clutter returns resulting from illumination within angle sidelobes of radar antenna of undesired scattering materials and reception of single-path and multi-path scattered energy therefrom via said sidelobes;

(3) clutter returns resulting from illumination within main beam(s) of radar antenna of undesired or even desired scattering materials and reception of multi-path scattered energy therefrom via angle sidelobes of radar antenna; and, (4) clutter returns resulting from illumination within sidelobes of radar antenna of undesired and possibly desired scattering sources and reception of multi-path scattered energy therefrom via main beam(s) of the radar antenna. For each of the clutter cases described above, sorted by whether the undesired energy results from various combinations of illumination of, and reception of energy from, scattering materials via radar antenna main beam(s) or sidelobes, there can be additional decomposition of the clutter problem, in the case of radars employing repetitive pulse transmissions, to address undesired radar energy from previous pulses scattered from objects beyond the normal range sampling intervals and arriving at the receiver during the normal sampling interval for a subsequent radar pulse transmission. This is also known as the second time around or ambiguous range problem for radars.

Cases 1 and 2 described above are important for implementation of some embodiments of airborne biota monitoring and control since, in some embodiments, radar beams may be employed which have a generally horizontal direction in close proximity to the ground or other significant scattering sources, such as trees, utility lines and support structures, vehicles, buildings, fences, and other objects typically found in the vicinity of agricultural crops. For such beams, angle sidelobes of radar antennas, although designed to be substantially reduced from main beams, will likely illuminate scattering objects and materials such as those identified above, resulting in return of appreciable radar energy via the sidelobes. In some geometries, strong multipath scattering can also occur, resulting in return, via sidelobes, of radar energy transmitted via the main beam(s), or vice versa, as noted in Cases 3 and 4 above.

Figure 1:
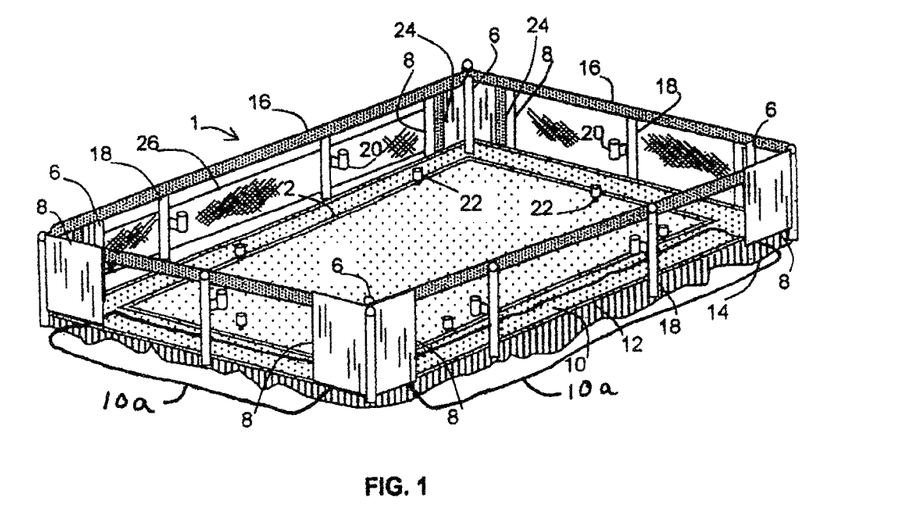
FIG. 1 is an isometric illustration of an embodiment of the invention that may be used to protect a crop field or other region, and that may employ a pond or other body of water in selected areas to help reduce backscatter clutter.
Figure 2:
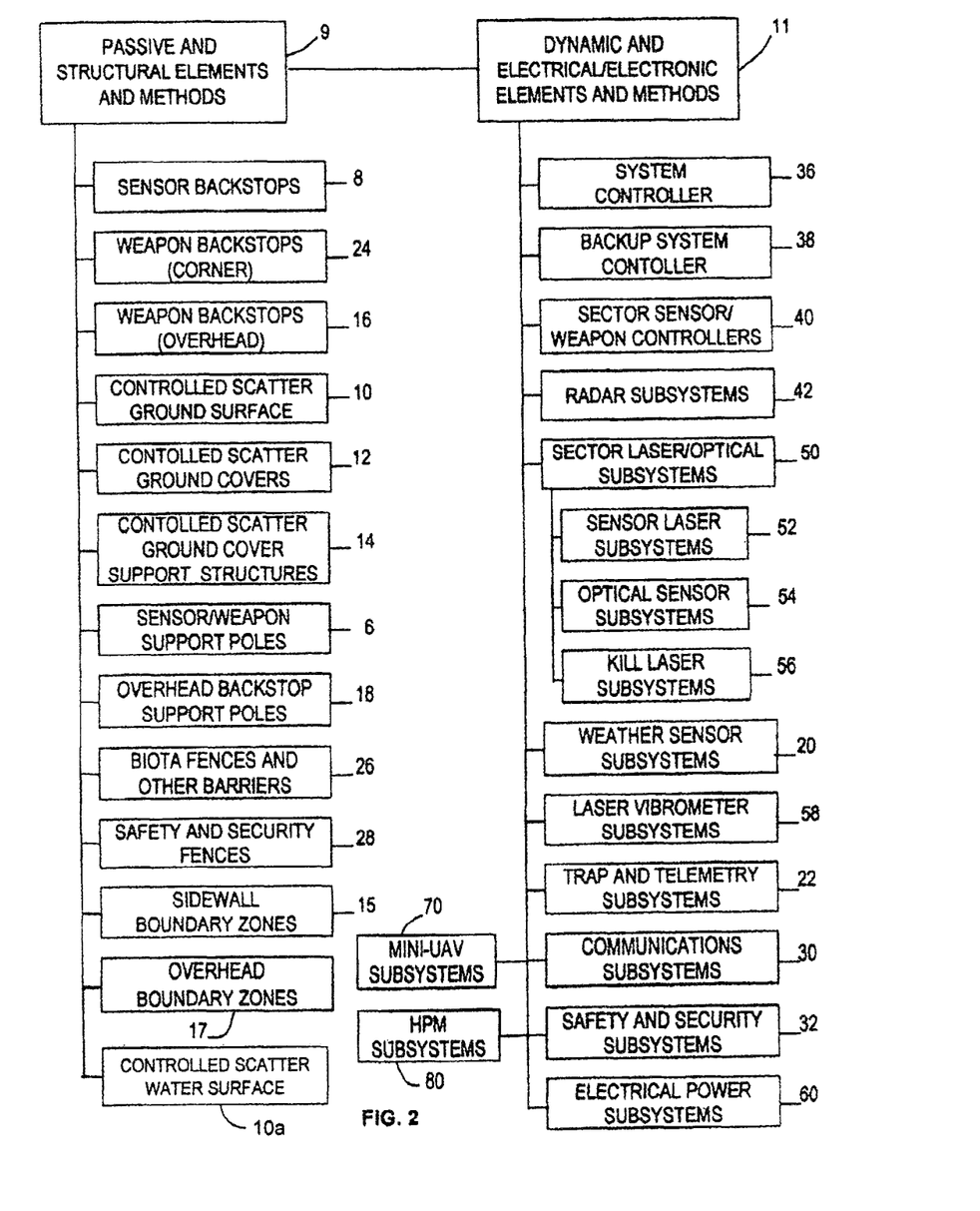
FIG. 2 is a block diagram showing various active and passive components that may be used in different embodiments.
Figure 3A:
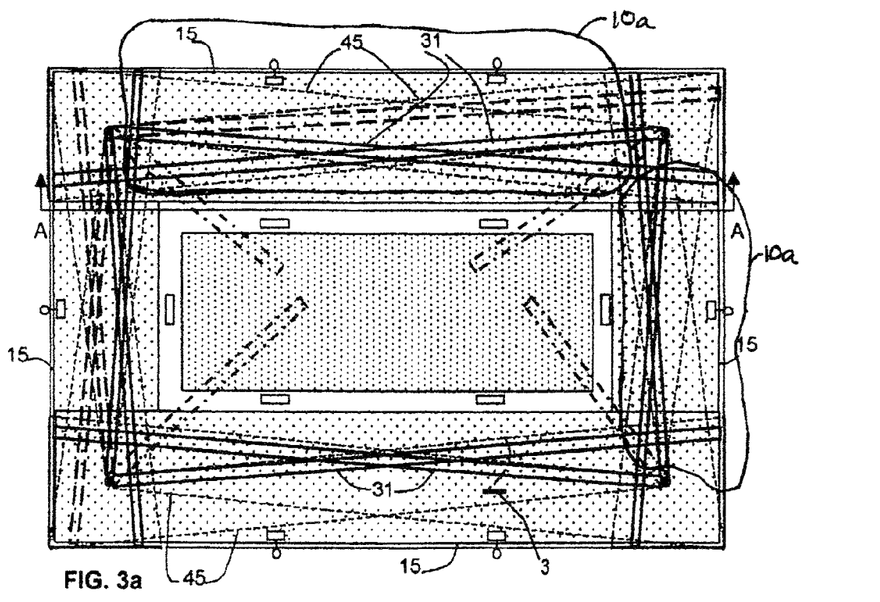
FIG. 3a is a representative top down view of an embodiment of an airborne monitoring and control system showing how a water surface may be incorporated below a sidewall boundary zone to reduce backscatter clutter.

It was noted in earlier applications that one technique for reducing clutter was to reduce vegetation within a boundary zone and/or to otherwise provide ground cover and other features that promote absorption and/or forward scattering of a radar beam while minimizing backscatter of undesired signals (i.e., clutter returns) toward a radar receiver. In some agricultural areas such as the Mississippi Delta region where catfish or other fish, frogs, freshwater shrimp, crawfish, or other aquatic animals may be grown for harvesting in addition to conventional crops such as corn, cotton, and rice, or in areas where ditches are used for irrigation or other purposes, it may be desirable to use fish ponds, or ditches wherein water is retained, located lengthwise along and beneath boundary zones to provide generally smooth forward scattering water surfaces below such boundary zones. FIGS. 1, 2, and 3a illustrate how one or more water ponds 10a may be used below some sidewall boundary zones 15 (FIG. 3a) in embodiments of an airborne biota monitoring and control system to promote forward scattering and reduce backscattered clutter as from a soil surface or vegetation. FIGS. 1, 2, and 3a are modified copies of FIGS. 1, 2, and 3a, respectively, from Applicants' U.S. Pat. No. 6,653,971, and other features in these figures are described therein and not repeated here. Using such ponds or ditches below sidewall boundary zones and below sidewall kill planes described in Applicants' prior patents may offer a two-fold advantage. A relatively smooth water surface in such ponds may promote forward scattering and reduce backscattered clutter which could interfere with detection of small targets such as insects. Additionally, pest insects disabled by a pest control laser (i.e., a kill laser, or a relatively high power microwave device as disclosed at col. 8 lines 54-58, and the discussion of FIG. 12 at cols. 17, 18 of Applicant's incorporated U.S. Pat. No. 6,653,971) should be safe for fish to eat and may thus provide additional useful nutrition for fish, frogs, or other animals being grown in such ponds. However, where aeration is used in such ponds to maintain an adequate oxygen content in water, bubbles from aeration units may cause an uneven water surface that causes increased backscatter clutter. In some embodiments, aeration units may be placed near sides of such pools to minimize presence of disturbed water surface below a radar beam path, and/or baffles may be placed around aeration units to reduce disturbance of surrounding water surfaces from aeration bubbles. In some embodiments, aeration units may be placed in bays created on a side of such ponds so that regions of disturbed water surface above aeration units are not below the main path of radar antenna beams or other signals being transmitted to detect airborne biota. In some applications, aerators may be placed below or within pipe sections which act as gas and liquid separators so as to discharge aerated water in downward slanted openings just below a surface of pond water while permitting bubbles to separate and escape from an opening in a top end of such pipes. Such an assembly would promote improved circulation in such ponds while providing aeration with minimal disturbance of water surface. For some applications, depending upon fish density and activity levels, aeration units may be turned off around sunset and left off for most of the night to reduce clutter from an aeration disturbed water surface when pest activity is generally greater than during daylight hours. In some embodiments, logic may be added in a radar processor to block out returns in range gates associated with such disturbed regions or to characterize the Doppler spread and other characteristics associated with such regions so that presence of insects or other biota flying through such regions could still be detected as excursions from "steady state" conditions in a manner similar to operation of a constant false alarm rate (CFAR) detection threshold capability used in some radars. For airborne biota monitoring and control systems having ponds or ditches below sidewall boundary zones, additional logic may be added in radar processor software to allow identification and/or rejection of radar signals backscattered from splashes created by fish or frog activity and or debris falling into such ponds or ditches. Other embodiments as disclosed in Applicant's incorporated U.S. Pat. No. 6,653,971, col. 29 lines 20-53, may use energy emitted from or by an airborne insect, or actively emitted electromagnetic radiation, for at least detection of an airborne insect. Additionally, in some embodiments, RF radiation may be used to support detection, tracking and classification of airborne insects. At col. 31, lines 50-64, and the block diagram of FIG. 2 and associated discussion in the paragraph beginning at col. 9 line 19 of Applicant's U.S. Pat. No. 6,653,971, passive detection using ambient sources of electromagnetic radiation is discussed. Additionally at col. 29 lines 20-53 and the flowchart of FIG. 12, active radar systems for transmitting electromagnetic radiation for detection of insects is discussed.

In Applicants' U.S. Pat. Nos. 6,853,328 and 6,653,971, it was noted that multiple optical apertures for optical sensors and/or kill lasers (also referred to herein as pest control lasers) may be needed to provide adequate coverage and alternate firing geometries within a boundary zone.

Figure 3B:
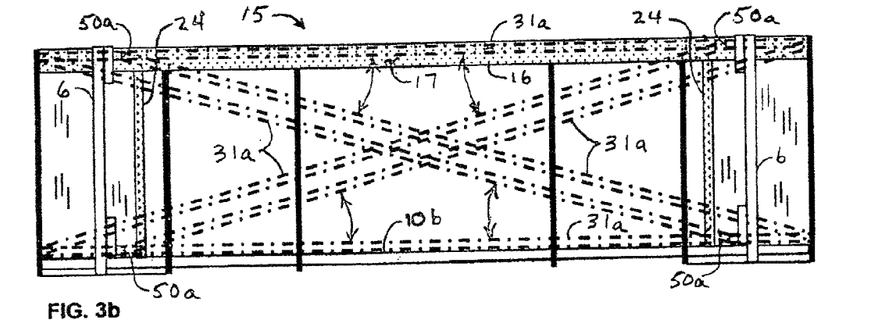
FIG. 3b is an elevation view of a representative sidewall boundary zone showing how four optical sensor/control laser apertures may be used to provide monitoring and control at essentially any location within a sidewall boundary zone.

FIG. 3b in the instant application has been modified to emphasize placement of optical apertures 50a which may be used to illuminate, and/or receive signals scattered from, targets flying through a sidewall boundary zone. FIG. 3b illustrates how four optical apertures 50a may provide essentially complete coverage of an entire sidewall without having to steer a sensor laser or pest control laser beam 31 a toward a surface 10b of the ground or water in a pond or ditch that may be located below a sidewall boundary zone 15. Such a geometry is desirable to prevent specular reflections from a surface of a pond 10a or a surface of a puddle that may form below a sidewall boundary zone after rainfall or irrigation. Heights of optical apertures and beam steering capabilities and limits may be adjusted to provide complete coverage in most installations, or one or more additional optical apertures (e.g., at mid-pole height) may be provided if necessary to provide complete coverage and/or to provide alternate firing geometries if needed in situations where a safety pre-pulse (described in Applicants' referenced prior patents) determines that a non-targeted object is in an intended beam path. Other safety features may include limiting injurious range of a laser kill beam by any of the methods disclosed in Applicant's incorporated U.S. Pat. No. 6,853,328, beginning at col. 38 line 21 through col. 39 line 27, and associated FIG. 2 and FIG. 17, respectively.

Although there are multiple techniques involving antenna design, material selection, special geometries, and control of material and objects in a vicinity of radar beam propagation paths which can be employed within an embodiment of an airborne biota monitoring and control system to help reduce clutter return problems associated with illumination, by antenna sidelobes, of, and backscatter or forward scatter from, materials in a vicinity of an RF propagation path direction of a main beam(s) of the radar antenna, there are other techniques in the general areas of waveform design and signal processing which can be used separately, or in combination with, techniques cited herein in implementing such embodiments in order to reduce problems associated with detection and discrimination of airborne targets having small RCS values. One technique includes use of Doppler processing to distinguish clutter sources such as plant leaves which may have a steady or quasi-periodic motion component (e.g., perceived range rate) in a direct range direction (or in a propagation path direction in the case of intentionally or unintentionally scattered beams), such motion component being within the general range of values associated with desired targets (e.g., insects) as distinguished from undesired targets (e.g., leaves or blades of grass waving or vibrating in the wind).

Since vegetation in a vicinity of an antenna beam path may also have a more-or-less periodic motion component in a range direction (or propagation path direction as noted above), such vegetation being driven by wind or other air currents or water currents or rain, or by motion of animals or other sources, it may be desirable to implement processing techniques which exploit differences in periodicity of motion associated with flight of insects and other biota from quasi-cyclic motion of vegetation. This may require that a radar signal processor maintain running averages over various window lengths (in time) of amplitude variations of returns which may be associated with the motion of objects (i.e., scatterers) in various range cells and then apply conventional techniques to determine when there has been a change in a given range cell which may indicate presence of an insect or other target of interest within that particular range cell or within a collection of range cells. For example, by monitoring amplitude variations over a series of multiple pulses, and by performing Fourier transforms over various selected sampling intervals, it may be determined that motion of a vibrating leaf may be characterized by a particular frequency or set of frequencies. In continued monitoring and use of Fourier transforms, new frequency content may be detected from time to time within frequency ranges associated with wingbeat frequencies, respiration rates, or other frequency content which may be associated with presence of insects. For radars employing monopulse or other angle resolution techniques, detections in adjacent range and/or angle cells may be used to provide confidence in detection of a moving insect or other object versus false alarms (e.g., as may be induced by wind gusts).

In some cases, use of very stable circuits, and/or use of analog to digital converters with high sampling resolutions (e.g., 12 to 32 bit or greater sampling depths), may permit use of conventional signal processing techniques to detect presence of very small changes in amplitude or Doppler components of radar returns, which small changes may be associated with passage through a sampling volume (i.e., collection of range and angle cells) of insects or other biota. In order to distinguish small changes in amplitude (associated with RCS, Doppler, polarization ratios, or other properties) within a given range cell or group of range cells, it may be necessary for signal and data processing functions of a radar to maintain multiple "running averages" over multiple windowing periods selected to encompass useful ranges of variations in order to distinguish signal deviations resulting from normal quasi-periodic motion of vegetation from signal deviations associated with presence of insects and other targets of interest. Multiple parallel correlators or other micro-processors may be employed to permit "tracking" of various deviations from "normal" signal variations in order to permit detection of small changes which may indicate presence of insects and discriminate signal changes associated with insect targets from changes associated, with other causes.

Multiple signals could be tracked to aid in distinguishing desired targets from clutter and to aid in discrimination among various types of desired targets (e.g., distinguishing moths from wasps and/or honeybees). This could include any or all of the various parameters which could be measured by various types of radars, including signals in multiple channels of such radars, and including such parameters as signal amplitude variations in sum and difference channels, variations associated with use of different polarizations on transmit and reception, correlation of Doppler with multipulse range changes, variations in Doppler shifts over multiple pulses, and dynamic (i.e., time varying) variations in amplitude, polarization, and other scattering properties associated with target motion and changes in target shapes.

Application of one or more of many conventional techniques known in arts of radar design, signal processing, and target discrimination, including techniques from a general area known as chaos theory, may be employed to support detection and discrimination of returns from desired targets from returns from clutter, and discrimination of one type of desired target from other types of desired targets.

Signal-to-noise-plus-clutter ratio may also be enhanced by using higher range resolution (i.e., shorter range cells). For many applications, range resolutions of approximately a foot or so may be desirable for reduction of clutter and to also help minimize an problems associated with multi-target interference, such as may occur when a radar is receiving energy from two or more desired targets at the same time (i.e., two or more targets within the same range cell or range resolution interval). Range resolutions of approximately a foot may be obtained by any of several known techniques, including use of short pulses, use of pulses encoded with pseudo-noise, also referred to as pseudo-random noise, as in PRN coded radars, with appropriate PRN decoding techniques included in the radar receiver, use of chirped pulses with appropriate de-chirping techniques in the radar receiver, or use of stepped frequency modulated pulses used in conjunction with a radar receiver capable of processing such pulses to obtain high range resolution (e.g., range cells of approximately one foot). High range resolution may also be obtained by using techniques and apparatus normally referred to in literature as ultra-wide band (UWB). Longer or shorter range, cells may also be implemented as appropriate for various embodiments using these or other known techniques. Use of shorter range cells allows energy from a desired small target, such as an insect, to be detected while minimizing receipt of energy from undesired sources within the same range cell, such as clutter or other desired targets at longer or shorter ranges. Other technologies that may be used with benefit in some embodiments of airborne biota monitoring and control systems include technologies normally referred to as spread-spectrum, including such techniques as direct sequence code-division multiple access and fast or slow frequency hopping, and also include other technologies such as digital beam forming and adaptive antenna arrays that can adaptively steer antenna beams or nulls in selected directions.

As noted in Applicants' prior patents and patent applications, some embodiments of airborne biota monitoring and control systems may employ one or more LEDs, lasers, flashlamps, or other light sources, which may include sunlight or other sources of ambient illumination to illuminate insects, other airborne biota, or other objects flying or floating in or through a sidewall or overhead boundary zone, or otherwise present in a boundary zone, so that light scattered from insects, other airborne biota, or other objects may be detected by various sensors and used to support detection, tracking, and classification of insects, other airborne biota, or other objects. At certain times of day or night, sensors may detect light scattered from airborne biota or other objects in a boundary zone illuminated by light from the sun or from the moon. Light sources may be selected to illuminate airborne biota with white light, with just one wavelength, or with multiple different wavelengths simultaneously or in a selected sequence. Wavelengths may be selected based on reflectance characteristics of selected airborne biota specimens at different wavelengths (e.g., to exploit different spectral characteristics, including iridescence, in discriminating different types of airborne biota, including discrimination among different types or species of insects), or wavelengths may be selected to create fluorescence effects (e.g., as in laser-induced fluorescence) Light sources may provide unpolarized or polarized light, including linearly polarized light, which may include horizontal or vertical polarizations, or elliptically polarized light, including circular polarization. Light sources may provide light having a high intensity or power, or a lower intensity or power, or a light source may provide pulses having a high instantaneous power or high energy content, or pulses having a lower instantaneous power or energy. Light may be transmitted isotropically, in narrow beams, as in a laser beam from a fiber laser or other type of laser, in very broad beams, as in a floodlight or similar source, or in other beam patterns, including conical or fan-shaped beams, such as may be created by circular or linear (e.g., line-source) parabolic reflectors, circular, cylindrical, or other types of lens, by holographic optical elements, by diffractive optical elements, by arrays of individual sources (e.g., as in a phased array or an array of bulbs or LEDs), by optically switched apertures, or by other means. Some embodiments may employ one or more fiber lasers to provide light at one or more wavelengths. Beams of light may be held static from one or more apertures, as in a linear array of apertures connected via optical fibers to one or more sources of light, including, for example, LEDs, fiber lasers or other solid state lasers, or semiconductor lasers, or may be scanned within, above, below, or near a boundary zone in a manner that provides confidence in detecting, or a desired probability of detection, of targeted types of insects or other airborne biota. Light may be transmitted in a continuous manner (e.g., as from incandescent light bulbs powered from an direct current source or from other so-called continuous wave sources), in pulses (e.g., as from a pulsed laser or from a continuous wave laser operating through a chopper that alternately transmits and blocks light), or light may be modulated in more complex or sophisticated ways, including, for example, amplitude modulation, use of chirped pulses, polarization modulation, or any or many other types of modulation known to those skilled in such arts. Selection of any specific combination of parameters outlined above for a given application and embodiment may be based upon many different considerations and tradeoffs, including a desired range within a boundary zone for a particular size or type of airborne biota, for a light source operating in cooperation with one or more detectors of one or more different types, and in cooperation with signal and data processing techniques operating in cooperation with a given type of detector and a given source of illumination.

Various types of sensors may be used to detect light scattered from insects and other airborne biota. Data from one or more sensors may be processed individually or in combination to support location, tracking, or discrimination of airborne biota. For example, one or more sensors may be co-located with an LED or laser source, even sharing the same objective optics, or may be located in a bi-static or multi-static sense to receive back-scattered, forward-scattered, or side-scattered light. Detectors that may be used include photodiodes, photo-transistors, charge-coupled device (CCD) arrays, photo-multiplier tubes, CMOS focal planes, and many other semiconductor based detectors used singly or in linear or in two-dimensional or three dimensional arrays. In many embodiments, it may be desirable to use separate sensors or types of sensors to support different types of measurements. For example, a CCD, CMOS, or other type of focal plane with a readout rate from 30 to 200 frames per second may be adequate to track flight path of an insect being illuminated by a laser or other light source, but a detector capable of measuring frequencies as high as 1000 cycles per second may be needed to measure wing beat frequencies and associated dynamics to support discrimination of some insects. In some embodiments, such sensors may, be combined into an integrated assembly which may also include capabilities for making measurements at different spectral wavelengths and which may also include capabilities for amplification of light transmitted to or received from targets.

Figure 4A:
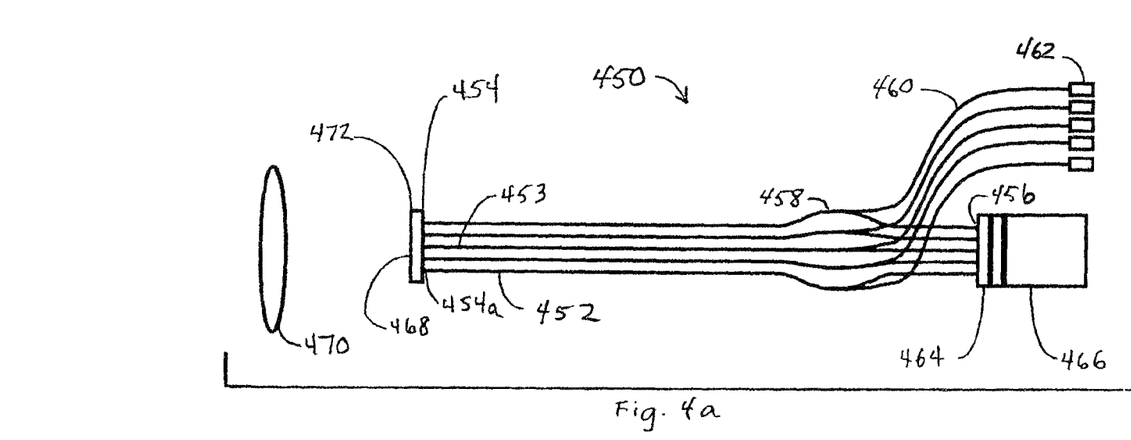
FIG. 4a is a diagram illustrating how a bundle of optical fiber amplifiers may be used to amplify received signals as well as signals transmitted for laser sensing and laser disablement of pest insects.
Figure 4B:
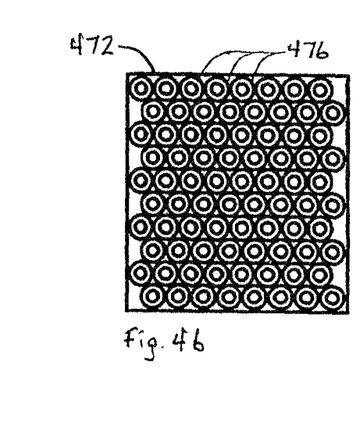
FIG. 4b illustrates a composite filter that may be constructed to reflect pump light while transmitting laser amplified wavelengths.

Some embodiments of the instant invention may combine one or more light sources and light receivers, amplifiers, and detectors into an integrated assembly 450 such as illustrated in FIG. 4a. An integrated source and detector assembly 450 may also include one or more lasers capable of generating continuous wave or pulsed laser, beams capable of causing sufficient damage or injury to targeted insects so as to render them incapable or less capable of damaging crops or other resources or harming humans or other animals. Referring to FIG. 4a, some embodiments may include a bundle 452 of optical fibers which may include fiber lasers as well as fiber amplifiers capable of amplifying photons coherently by stimulated emission. Optical fibers in bundle 452 may be arranged in a manner that allows an image projected upon an end 454 of fiber bundle 452 to be transmitted and presented as the same image at an opposite end 456 of fiber bundle 452, as in a borescope or an endoscope. Some embodiments may employ a bundle 452 of fiber amplifiers or fiber lasers wherein, on one end, fiber bundle 452 is cut and arranged so as to form an image receiving surface 454a similar to an end of a optical fiber borescope or endoscope wherein an image may be projected onto the ends of fibers so arranged, with each fiber being surrounded by one or more layers of cladding, or being embedded in an appropriate medium that contains the optical fibers and provides an optical index that maintains total internal reflection within individual fibers. In some embodiments, such a medium may also support transmission and coupling of optical radiation that serves as a pump source for excitation of lasing material incorporated via doping into core fibers. In such arrangements, each fiber, in effect, comprises a single pixel of a focal plane, as will be explained more fully below. As illustrated in FIG. 4a, at one or more regions 458 along the lengths of fibers in fiber bundle 452, individual fibers and their associated cladding may be separated so that other fibers 460 being used to transmit pump light from laser diodes 462 or other sources may be spliced into other otherwise affixed to or joined to cladding of fiber amplifiers so as to enable transmission of pump light into the cladding and thence into core fibers. Such areas of joining of pump light fibers 460 with cladding of doped fiber amplifier fibers may employ V-groves, grating, or other techniques known to those familiar with fiber lasers. For sake of simplicity and clarity, FIG. 4a illustrates only a few fiber amplifier fibers and their associated optical pumping fibers and sources of optical pumping light, but is to be understood that various embodiments may employ hundreds of fiber amplifiers in each row and column so as to provide a high resolution focal plane array. In various embodiments, ends 456 of fiber amplifier fibers opposite image receiving ends 454a may be separately coupled to individual optical detectors, such as avalanche photodiodes, or fibers may be brought back together in linear arrays, rectangular arrays, or other arrangements and coupled with optical detectors 464 arranged in matching formats, such as linear or rectangular detector arrays. Such arrays, for example, may be CMOS linear detector arrays or rectangular focal plane detector arrays or CCD arrays. In one embodiment, for example, rows of fiber amplifier core fibers and their associated cladding may be separated behind an image receiving surface 454a using wedges of a suitable material, with each wedge having a groove for each fiber, with grooves being arranged, for example, in fan shaped patterns so as to provide sufficient separation of fibers to allow attachment of fibers carrying pump light, and, in some embodiments, to allow attachment via splicing or other joining methods of other fibers. Such separation may also allow fibers to be attached individually or in groups to detectors or detector arrays. Detectors or detector arrays may contain analog-to-digital (A/D) converters and other circuit components 466 that permit amplification and/or sampling of amplitude and time of arrive of waveforms of light scattered from target objects and amplified by fiber amplifiers and delivered to detectors as described above. The use of optical fiber amplifiers, as described above, provides amplification of photons scattered from various target objects, such that amplified signal levels are sufficient for direct detection by CMOS or other technologies which may be used to also provide, in integrated electronic chips, other electronic functions needed to enable operation of an imaging laser radar, including integrated capabilities for temporal (i.e., time of arrival) measurements for virtually all "pixels," and spectral measurements for selected fibers operating as fiber lasers at different selected wavelengths to provide a spectral measurement capability. Other fibers may transmit other wavelengths for pumping or for transmission through fiber amplifier fibers, or may provide paths for sampling pump light in cladding (e.g., for control purposes) or for sampling light in fiber amplifier core fibers.

Figures 4C, 4D:
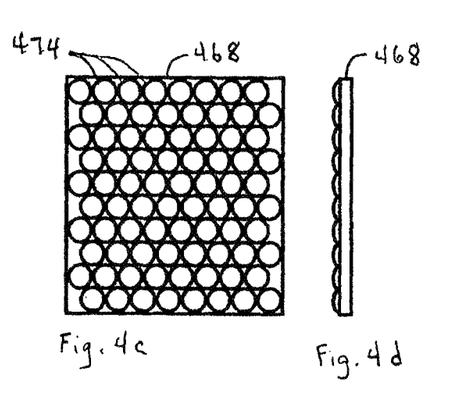
FIGS. 4c and 4d are face-on and side-on views of a microlens array that may be used to couple light in a image to individual fibers in a fiber bundle.

An image receiving end 454a of a bundle 452 of fiber amplifier fibers may be affixed directly or via index matching gel or similar substance directly to a lenslet 474 array 468, as also illustrated in FIGS. 4c and 4d, which may function to help match numerical apertures of individual fibers with angles of arrival of photons in a image projected by a lens or lens assembly 470 as illustrated in FIG. 4a. A dichroic or interference filter and, optionally, an array 472 of dichroic or interference filters and mirror combinations 476, may be integrated into an optical path between a lenslet array 468 and an image receiving surface 454a created by ends of fibers in a bundle 452 of fiber amplifier fibers. Such a dichroic or interference filter and mirror assembly may be designed via proper selection of materials, layer thicknesses, and number of layers, to reflect photons at a wavelength used for optical pumping and traveling in a core fiber or in cladding and to transmit photons at wavelengths that fiber amplifier core fibers are designed to amplify, transmit, and emit. hi some embodiments, one or more dichroic or interference filters may be implemented as a single filter covering ends of all fibers in an image receiving surface 454a, or individual dichroic or interference filters and/or mirrors may be created separately on ends of fiber amplifier fibers and cladding using masking and deposition techniques similar to those used for production of semiconductor devices, or other techniques resulting from other technologies developed for manufacturing of semiconductor devices, Micro-electro-mechanical systems (MEMS) technologies, nano-technologies, holographic optical elements, diffractive optical elements, or similar technologies. For example, an array of mirrors having cross-sections similar to cross-sections of a torus may be created via use of photoresist, vapor deposition, and other known techniques, to match inner and outer diameters of optical cladding and designed to reflect light at pump wavelengths back into cladding and, optionally, into fiber amplifier core fibers. Interference filters designed to transmit wavelengths amplified by fiber amplifiers may be added to ends of core fibers of fiber amplifiers. In this manner, pump light energy may be conserved and reflected back into cladding, while photons at a wavelength intended to be amplified by a fiber amplifier are admitted into core fibers of fiber amplifiers, and light at wavelengths not desired to be amplified or detected is blocked from entry into fiber assembly. Similarly, interference filters designed to transmit only a desired wavelength or desired wavelengths amplified within a fiber amplifier may be added between an opposite end of each fiber amplifier fiber and one or more detectors or detector arrays to which an optical fiber or group of optical fibers may be coupled. Such an arrangement may allow only photons of one or more desired wavelengths to reach each detector, thereby reducing noise from other wavelengths and enhancing detector signal-to-noise ratios for desired signals. Interference or other type mirrors may also be used at detector ends 456 of fiber amplifiers to reflect pump light back into cladding or core fibers of fiber amplifiers. In some embodiments, special fibers, e.g., fiber amplifiers designed to transmit and amplify other wavelengths and used to support spectral measurements at selected wavelengths, may be integrated into fiber bundle 452 and may require special treatment to provide interference filters designed to transmit their operating wavelengths, or interference mirrors designed to reflect light at different pump wavelengths. As noted, some fibers in bundle 452 may be fiber lasers capable of generating energy or power sufficient to kill or incapacitate specific insect pests or other undesired airborne biota. Electro-optic or acousto-optic devices such as Q-switches or other types of optical switch may be integrated with specific fibers to enable control of lasing functions of other aspects of an assembly.

Objectives of an assembly 450 such as illustrated in FIG. 4a may include (1) providing a capability for one or more fibers in bundle 452 to generate a continuous wave, pulsed, or otherwise modulated beam of energy at one or more specified wavelengths that may be transmitted, as in a laser radar, to illuminate objects flying or floating through a boundary zone, (2) provide a capability to amplify light scattered from various objects illuminated by light generated in accordance with (1) above and which scattered light arrives at an assembly to be imaged onto ends of one or more fibers in an image receiving surface 454a; and (3) deliver such amplified light to one or more detectors 464 located at an opposite end of such fiber amplifier fibers. As an example, fiber bundle 452 may include a fiber 453 of a fiber laser at its center (i.e., on an optical axis of lens assembly 470), which may be extended through or beyond an image receiving surface formed by most of the other fibers in bundle 452 so that light emitted from that extended center fiber 453 may be spread sufficiently to illuminate a desired cone angle. In some embodiments, an additional ring (normally a hexagonal ring) of other fibers surrounding a central fiber 453 may also be used to transmit CW or pulsed laser energy, perhaps at a wavelength different from that used for sensing, designed to kill, incapacitate, or stun pest insects or other airborne biota or other pests detected in a boundary zone or within another portion of a monitored location or region.

Although the example above illustrated use of fiber lasers and fiber amplifiers, other assemblies may be developed that use other laser technologies such as thin disk lasers, spinning disk lasers, vertical cavity surface emitting lasers (VCSEL), or other laser technologies for sensor lasers and/or for pest control lasers in some embodiments of an airborne biota monitoring and control system. Assemblies such as illustrated in FIG. 4a may also be integrated with other optical elements including scanning mirrors, beam splitters, and the like to provide beam steering and other functions as will be evident to those skilled in such arts.

The following paragraphs describe additional embodiments or extensions of airborne biota monitoring and control systems identified in Applicants' U.S. Pat. Nos. 6,653,971 and 6,853,328, and in Applicants' U.S. patent application Ser. No. 11/054,685. In particular, embodiments described below relate to creation of a system for pest insect control combining the utility of controlling pest insects such as' mosquitoes with recreational or entertainment features similar to features in video games wherein participants control small, radio controlled aircraft to engage and incapacitate flying insect targets determined to be pests using sensors, processors, and/or display devices such as virtual reality headsets or special eyewear whereupon images may be projected and/or superimposed upon real world scenes. It is anticipated that the system described below would be operated primarily at dusk or in the evening or early morning hours, when generally slower flying pest insects such as mosquitoes or moths tend to be more active and in-flight.

Figure 5:
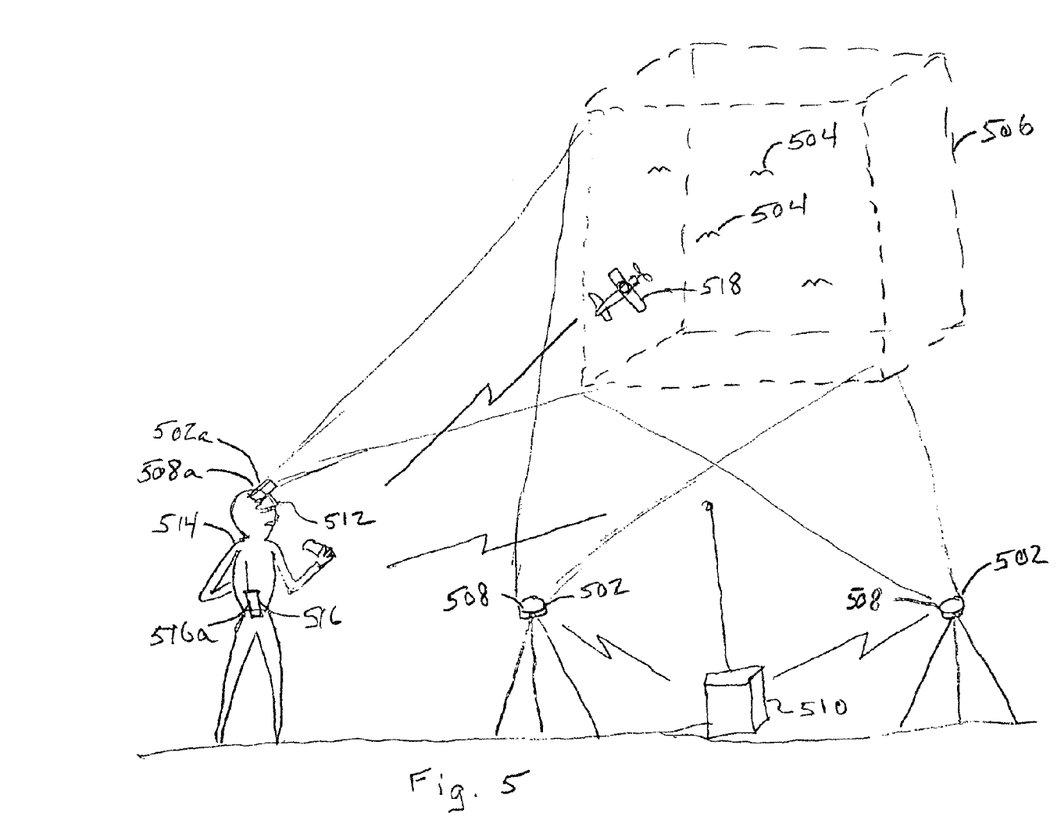
FIG. 5 is an illustration of an embodiment of an airborne biota monitoring and control system wherein sensors are used to provide information for displays used by a human operator to control flight of radio-controlled aircraft to engage pest insects.

Referring to FIG. 5, LEDs, laser diodes, Vertical Cavity Surface Emitting Lasers (VCSEL), or other light sources 502 may be used to illuminate insects 504 and other creatures flying in an "engagement volume" 506 (perhaps a cube 100 to 200 feet on a side) with said light source 502 perhaps generating light, or filtering to, wavelengths in an "eyesafe" region in the infrared spectrum (e.g., wavelengths slightly longer than around 1.54 microns) which wavelengths are generally less likely to attract or alter behavior of insects. Such light sources 502 could be operated in a flash or pulse mode in synchronization with a shutter system on one or more sensor 508, which may be imaging sensors, but a light source 502 could also be a continuous light source scanned rapidly across an engagement volume 506. Light source 502 could be a laser or other light source operated with a beam spreader lens to fill much of an engagement volume on each pulse, or light source 502 may be used with a semi-cylindrical lens to create a sheet of light scanned rapidly across an engagement volume, or light source 502 could be a narrow laser beam scanned rapidly across engagement volume 504 in a raster scan or similar mode. In some embodiments, light source 502 and sensor 508 may together comprise a laser radar and/or a 3-D laser scanning device. In many embodiments, sensor 508 may be capable of operating with low light levels. In some embodiments, light sources 502 and sensors 508 may include lenses to support operation with insect targets at ranges of 50 feet to 400 feet and may be positioned so that imaging versions of sensors 508 create "stereo" views of insect flying in engagement zone 506. In a simple embodiment, such images may be transmitted directly, or via a processor 510, for display on eyewear 512 worn by a user 514. Eyewear 512 may be glasses whereupon images may be projected and superimposed on real world scenes as viewed by user 514 through such glasses. Such eyewear 512 is commercially available and used to project, for example, television or other video imagery into a users field-of-view without blocking visibility of real world scenes and objects normally visible to a user 514. Processor 510 may be used to enhance imagery and/or add information to images. For example, processor 510 may employ discrimination algorithms based on wing-beat frequencies and other parameters disclosed in Applicants' prior patents and patent applications referenced earlier herein to classify and mark images of insects classified as pests. Such marking may be by color coding, use of special symbology, or other conventional means. Images thus processed and/or enhanced may then be transmitted via conventional wired or wireless link to a receiver 516 coupled to eyewear 512 as described earlier. User 514 may then use images presented on eyewear 512 to direct flight of radio controlled aircraft 518 so as to engage insects 504 appearing to be, or classified by processor 510 as, pest insects so as to disable pest insects via impact with aircraft 518 propeller or a special kill enhancement device such as a laser beam generator or a projecile thrower as disclosed in Applicants' incorporated U.S. Pat. No. 7,501,979 at col. 6 lines 30-40. Also, an aircraft pesticide sprayer mounted to a minature aircraft may be used to kill insects, as disclosed in the abstract of Applicant's incorporated U.S. Pat. No. 6,682,971. Radio controlled aircraft used in such applications may be classic glow-plug RC aircraft or newer electric aircraft. In some embodiments, RC aircraft may be electric powered and may preferably have high maneuverability. In some embodiments, a video camera and wireless link may be added to RC aircraft 518 to transmit live video imagery back to a receiver 516 coupled to eyewear 512 so that a user 514 may be provided live video from the aircraft for use in directing an intercept with an insect 504. In a simpler embodiment, a light source 502a and monocular or binocular sensors 508a may be integrated into headwear and used to collect and provide imagery to eyewear 512 for display to a user, or a light source 502a may be used together with "night-vision" goggles modified with telescopic lens to allow a user to view insects and RC aircraft in an engagement volume and direct RC aircraft so as to engage such insects. In some embodiment, light source 502a may be pulsed and coupled to rangegated night vision goggles to enhance visibility of insects at selected ranges of interest without undue clutter from airborne particulates, fog, or other insects. In some embodiments, telescopic lens may use adaptive lens that change shape and thus focal power by changing pressure of volume of a fluid filling or other means, or such lens may also use conventional autofocus techniques modified for use with small targets.

In a more sophisticated embodiment, one or more light sources 502 and sensors 508 may function together as a laser radar or lidar so as to providing range information as well as angle information, and thus provide 3-dimensional data on positions (and, in some embodiments, directions) of insects detected in engagement volume 506. Such data from sensors 508 may be transmitted to and processed by processor 510, which may be integrated with sensor 508 or located separately, to provide 3-dimensional coordinates (e.g., x, y, z) or state vectors of each detected insect, or just insects determined to be pests, and may include images or symbols representing other objects to be avoided, such as bats and birds, so that only limited data needed to describe "target" positions would need to be transmitted to a receiving computer 516a which could use the information, along with other information, to regenerate a 3-D scene (e.g., a 3-D "air picture" of flying creatures and RC aircraft with optional color coding and "trails" similar to "mouse trails" as used on some computers to help user locate cursor position) directly on virtual reality goggles or on eyewear 512 as mentioned above capable of presenting superimposed video information while allowing a user to also view his surroundings. In some embodiments, a small inertial navigation system, or a GPS receiver with directional pointing capability, may be integrated with eyewear 512 or virtual reality goggles and computer 516a so that displays presented to a user may be properly aligned with user 514 surroundings. However, in some embodiments, an RC aircraft may also be imaged and presented to a user 514 along with images of insect positions so that a user may use sensor-provided imagery to direct flight of such RC aircraft as it approaches a targeted pest insect.

Radio controlled aircraft may be small, radio-controlled aircraft with electric motor(s) propulsion, or with small internal combustion engines (e.g., glow plug or other fuel). Electric motor powered are preferable for simple backyard systems, but other models using internal combustion engines, or even pulse jets, for propulsive power could be used. Several groups (e.g., one at/near U.C. Berkley, another, at/near Georgia Tech) are developing small aircraft that use flapping wing propulsion similar to that used by insects or small birds. Small aircraft based on flapping wing flight could also be used to engage pest insect targets.

In another embodiment, aircraft may be inflatable with helium or hydrogen, but still in a general shape of a conventional aircraft with wings, elevators, rudders, and even ailerons, perhaps operated by piezo-electric strips or similar actuators under control of a conventional multi-channel radio control system. Such aircraft may be almost-lighter-than-air and fly more slowly than conventional aircraft to permit more controlled engagements with slow flying pest insects such as mosquitoes. Other versions may be in a delta-wing form, or similar to miniature versions of conventional blimps. Preference, for some applications, is for an almost lighter-than-air aircraft with flight speeds ranging from approximately 5 to 15 miles per hour. Other applications may use micro-UAVs such as developed for military and police surveillance applications.

Where embodiments of airborne biota monitoring and control systems such as described just above are used in commercial entertainment or recreational applications, aircraft propelled by electric power may be preferred, and such aircraft could be designed and programmed to assume autonomous control after aircraft fly out of an engagement zone or below a selected altitude, or a supervisory control system could override the game-playing operator and assume control of the aircraft if unsafe or potentially damaging actions were attempted by a user. When flying under autonomous control, an aircraft may use GPS, differential GPS, miniature INS, or some other precision position reference system to return the aircraft to a landing area, where the aircraft may land directly on rails that may be used to recharge batteries, or may be taxied to a charging area which can make automatic contact, e.g., as by flexible contact springs, to energized electrical contacts so as to be automatically recharged, and be capable of taking off again under radio control, or under autonomous control, without requiring human intervention.

In some embodiments, in order to make a recreational application more challenging for a user and which may make an RC aircraft engagement more closely related to a natural process of engagement of an insect by a bat, and to also provide a "sporting chance" for moths and possibly other pest insects about to be engaged by said small aircraft, the small aircraft may be equipped with sound transmitters/transducers capable of emitting sounds at frequencies and in burst patterns, perhaps complete with overtones, such as used by bats for echolocation. In some embodiments, aircraft may also be equipped with stereo sound receivers/microphones which may be coupled together to allow determination of intensity, direction, patterns, and other characteristics, and which may be used in conjunction with said sound transmitters/transducers to create, in effect, a sonar system that supports actual echolocation and even discrimination of moths and other airborne objects as practiced by bats. In embodiments equipped with full "sonar" instrumentation, the timing, direction information, reflected pattern information, and other information may be processed on board to permit identification and direction to targets or may be transmitted via high bandwidth telemetry to processors on the ground for such determinations. In either case, results of target identification and direction determination may be provided to stereo goggles or other means of display to a local or remotely located participant or user who may also be controlling the flight direction of the small aircraft directly via hand-held radio control unit, or remotely, via joystick or other user input transmitted via a low latency Internet connection or other low latency telecommunication link.

One key reason for adding an ability to transmit sounds essentially like those transmitted by bats is that several species of moths or other flying insects are known to exhibit evasive behavior upon hearing such frequencies, with the nature of their behavior, in some cases, depending upon the intensity of the "bat sounds." For a source of "bat sounds" presented to moths at low intensity, some moths (i.e., species) are known to generally and simply fly in a direction that takes them away from the source of bat sounds, but when bat sounds are presented at higher intensities, some moths (i.e., species), as well as katydids and probably some other insects, are known to fold their wings and drop, or drastically change their direction, whether in a "conscious" attempt to evade an approaching bat, or whether in a simple reflex action.

Some embodiments may use a "freeze" frame after an engagement to help record and score and engagement, and some embodiments may use special circuits on propeller motors or kill enhancement devices to detect a voltage spike that will accompany a hit by a propeller or spinner.

In order to support an ability to provide early forecasts and warnings to game participants of an upcoming opportunity to engage larger numbers of insects engaged in migratory flights as disclosed in Applicants' prior patents and patent application referenced herein, satellite and airborne imagery, and other satellite or aircraft hosted remote sensor technologies, may be used to observe those areas of the earth where insects of various species are known to breed and multiply. Such observations may provide, for example, information on the status of host vegetation, humidity/moisture, temperature, and other parameters related to insect populations that indicate whether, in a given year or season, a larger or smaller population of a given species of interest may be expected to be available for migration. These observations may be coupled with ground-based observations in such host regions. Migration trigger events and wind patterns may be used to predict onset and progress of migratory flights of insects, and include predictions of arrival times in certain locations where sensors, aircraft, laser weapons, and other assets needed to support engagement of migrating insects are available or may be pre-positioned based on such information. Migratory flights may also be tracked, to some extent, by air traffic control and weather radars, including the national network of NEXRAD radars as well as a collection of radars owned and operated by TV stations, universities, and other organizations. Information collected from satellites, ground based radars, or even airborne radars, may be assimilated and used to send alerts via e-mail, pagers, or other means to alert potential game participants of an impending opportunity, via a video game or other remote control capability, to engage incoming insect pests. Weather radars and other radars which include polarimetric measurement capabilities will provide enhanced capabilities to support classification of detected flights of airborne insects.

In some embodiments, aircraft with forward looking sensors/camera(s) may be able to fly down between rows of plants to chase and engage insects similar to scenes in various movies wherein aircraft are flown through narrow canyons and mountain passes or such.

The following paragraphs point out some of the numerous on-going advances in the fields of laser, photonics, optics, and electronics that have been made over the past few years and which may be incorporated into various embodiments of airborne biota monitoring and control systems identified in Applicants' U.S. Pat. Nos. 6,653,971 and 6,853,328, and in Applicants' U.S. patent application Ser. No. 11/054,685.

One key advance is in the area of fiber lasers. By doping the glasses and plastics used in manufacturing optical fibers with appropriate materials capable of supporting lasing, and by then pumping the optical fiber materials through appropriately index matched cladding and by other means, generally involving use of diode lasers as sources of pumping light, considerable powers and electricity-to-photon power conversion efficiencies have been obtained. Fiber lasers having fiber diameters that support only a primary TEM(0,0) propagation mode have also been used to produce high a high quality beam that can be better focused at a distance with less loss. Furthermore, as noted in a previous writing by this author, appropriately doped and pumped optical fibers can be bundled together in a manner similar to that used in fiber borescopes and matched with appropriate dichroic filters and focal plane arrays so that the pumped optical fibers serve as fiber amplifier and amplify received signals, as from a laser radar, such that less sensitive but less expensive focal plane detectors may be used in video and laser radar devices.

Another key technology that may be used to reduce costs of selected embodiments of airborne biota monitoring and control systems are proportionally steered micromirror arrays, such as developed by Boulder Nonlinear Systems (Boulder, Colo.) and by Lucent Technologies. Individual mirrors within a micro-mirror array may be used to steer all or portions of a beam of light from a laser, LED, or other sources, including arrays of Vertical Cavity Surface Emitting Lasers (VCSELs) such that individual mirrors, or groups of mirrors, in a micro-mirror array may be used to simultaneously point multiple beams of light at different targets, such as different insects flying over a field or within a boundary zone as noted in referenced patents. Other mirrors within such micromirror arrays may be used to steer reflected light from such targets to different detectors, and including quad detectors which may be used to steer some of the mirrors in a micro-mirror array used to track such targets, thereby enhancing an ability to obtain time resolved information as needed to support discrimination and classification of said targets as pest, beneficial, or neutral, as defined in referenced patents. Individual mirrors within such micromirror arrays, or groups of mircomirror arrays, may also be individually steered, with appropriate control electronics, and used to focus energy from one or multiple sources onto a target so as to support implementation of a kill pulse on targets identified as pests or otherwise selected for destruction or impairment.

Another key technology which may be used in various embodiments of airborne biota monitoring and control systems is VCSEL laser technology. VCSEL lasers have been shown to be capable of electrical-to-photon power conversion efficiencies exceeding 50 percent. This represents a higher power conversion efficiency than is available from conventional implementations of carbon-dioxide (CO2) lasers, although some innovative combinations of VCSEL, laser diode, or LED pumping of CO2 lasers may exceed the 10-20 percent electrical-to-photon power conversion efficiency for CO2 lasers noted in referenced patent applications. Although the high power conversion efficiency for VCSEL laser have so far been achieved for only relatively low power lasers (e.g., milliwatt class), VCSEL technology supports mass production of thousands to millions of such lasers on wafers or chips, using production techniques similar to those used to produce large scale integrated semiconductor chips. Furthermore, Sandia National Laboratories reports fabrication of VCSEL arrays operating in ultraviolet or near-ultraviolet wavelengths. Thus, linear arrays or similar configurations of VCSEL lasers could be used to pump other laser technologies, including Nd:YAG, CO2 and others, including fiber lasers as noted above, or, VCSEL arrays may be mated with lasing or non-lasing fiber bundles and integrated with beam-combining technologies to provide the powers needed for laser sensors or pest control lasers in various embodiments of airborne biota monitoring and control systems.

Yet another group of technologies being funded by Defense Advanced Research Projects Agency, and probably others, are lens technologies based, to some degree on biological lens (e.g., as in human eyes, insect eyes) which are capable of changing focal lengths based on changing either shapes or refraction index or combinations thereof. One such lens technology of interest are fluidic lens such as being pursued by AeroVironment, Inc. and others. Fluid lens, and related lens technologies, may be changed in shape, and thus in focal length by changing pressure of a fluid within a flexible membrane so as to cause a controllable deformation of a lens formed by a combination of membranes and fluid so that individually, or in appropriate groupings, such lens may be used to create lens that can zoom in or out on objects, or on a scene, without the weight and related complexities of obtaining a zoom capability with conventional glass lens. Such lens technologies may have application in embodiments of airborne biota monitoring and control systems in at least two areas. First, such lens may be used in rapidly changing focus between insects or other biota targets at different ranges to enhance performance of laser radars or other optical sensors, and to enable focusing of kill laser energy on a selected target without the weight and reliability problems associated with more conventional glass optics. A second area for use of such lens would be on small video cameras or similar sensors mounted on remote controlled aircraft, as anticipated in the patents and patent applications and other disclosures cited above. As noted, in some embodiments, data from ground based sensors could be used to construct a three-dimensional air picture with intended targets, selected via various discrimination techniques, identified in 3-D imagery presented via stereo goggles or by other means to locally or remotely located operators or participants in a video game. Such operators or participants could be allowed to control flight of small, unmanned aircraft (e.g., similar to small radio-controlled aircraft flown by hobbyists), wherein small video cameras are located. Upon approaching a target, a fluidic or similar lightweight lens could be used to control zoom and field of view of a video camera integrated with an analog or digital wireless link (i.e., RF or IR/optical) which transmits real-time imagery back to a ground station, and thence to a local or remotely located operator (as through the Internet or special, low-latency telecommunications media) so that said operator can control flight of said small aircraft so as to engage a target by either direct impact or by miniature weapons on-board said small aircraft. The lightweight fluidic lens and associated control electronics could provide a useful capability to detect an airborne target, such as an insect, at some range, then control zoom and focus to as to maintain appropriate imagery while a small aircraft is flown closer to such a target. Such a capability may be implemented in a toy or video game or in a more serious capability used by professionals to identify and or engage targets or interest.

Another technology which may be used to advantage in embodiments of airborne biota monitoring and control systems as disclosed in referenced patents and patent applications is use of holographic optical element (HOE) technologies to support focusing and scanning of sensor or kill lasers. Holographic optical elements have been described in literature and used in implementation of products for consumer applications, such as CD-ROM devices, and have been used in airborne LADAR/LIDAR applications by NASA and others. HOE provide another means for focusing and scanning beams for lasers and other optical sensors such as used in embodiments of airborne biota monitoring and control systems.

Figure 6:
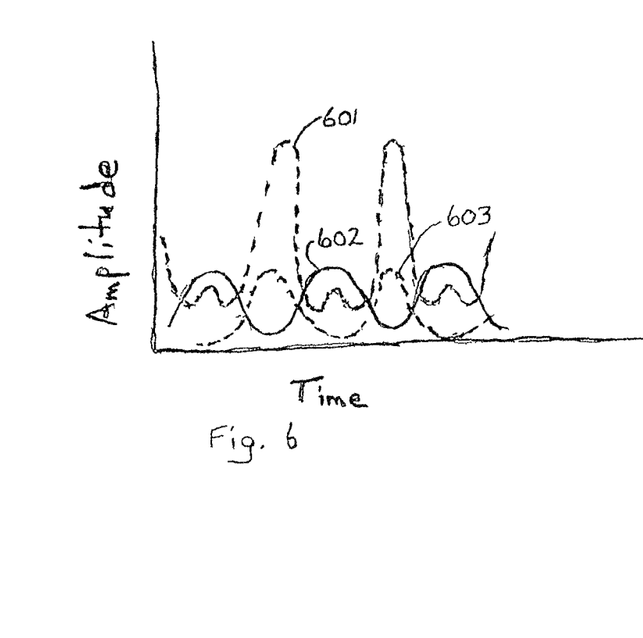
FIG. 6 is a graph showing how relative amplitude and phasing of different spectral lines may be measured and used as a discriminant to classify insects as pest or non-pest.

It was noted in Applicants' prior patents and patent applications that spectral information may be useful in discriminating pest insects from non-pest insects, and in perhaps providing a more refined level of classification. Insects display different colors, which may be due to pigments that absorb or reflect light at different wavelengths, or which may be due to iridescence (reflections of particular wavelengths due to constructive interference from multiple layers within an insect's integument or wings). FIG. 6 illustrates how the relative phasing and amplitude of light reflected at different wavelengths from a flying insect illuminated and viewed from one side may vary and indicates how such information (referred to herein as spectral dynamics) may be used as an additional discriminant to help classify insect targets as pests or non-pests, and which may also be used to infer additional information regarding insects detected by sensors incorporated into embodiments of airborne biota monitoring and control systems. Curve 601 may be a received amplitude time history for a wavelength reflected strongly from a lower surface of an extendable wing of a beetle. Curve 602 may be an amplitude time history for a wavelength reflected strong from an upper surface of the hard outer covering of the beetles wings (as in a common lady bug). Curve 603 may be an amplitude time history for a wavelength associated with the side of the abdomen of the beetle. As the beetle flies, the relative amplitude and phasing of amplitude at different wavelengths changes as the extendable (foldable inner wing) wing flexes and alternately covers the abdomen, causing amplitude of the wavelength reflected from the abdomen (curve 603) to go to a minimum, while amplitude of a wavelength reflected from an increasingly exposed hard upper or front wing increases. As the extendable wing raises on the next wing beat, the amplitude of the wavelength (curve 601) associated with the lower surface of that wing increases, while the amplitude of a wavelength associated with the hard upper wing decreases as its angle changes and as it is covered by the raising lower wing. Such interactions, in terms of amplitude swings and phasing, are likely to be relatively distinct among different types of insects, and such variations in signal may be analyzed by conventional techniques to provide additional information that may be fed to a neural net or other conventional classifier along with other information such as RCS to support classification of an insect target as pest or non-pest.

Having thus described our invention and the manner of its use, it should be apparent from our disclosure to one skilled in the arts to which the subject application pertains that incidental changes may be made thereto that fairly fall within the scope of the following appended claims, wherein we claim:

The invention claimed is:

1. An insect control system for controlling airborne insects comprising:
    an electromagnetic energy source including at least one of said airborne insect, ambient electromagnetic energy or directed electromagnetic energy,
    at least one detector of electromagnetic energy emitted or scattered from at least one said airborne insect, said at least one detector providing a detection signal representative of detected said electromagnetic energy from said at least one airborne insect,
    at least one processor responsive to said detection signal from said at least one detector, said processor generating at least one command signal,
    an airborne insect disabling or killing system responsive to said at least one command signal, for disabling or killing said at least one airborne insect.

2. A system as set forth in claim 1 wherein said at least one detector and said at least one processor are configured to support determination of at least a direction to said at least one airborne insect from said airborne insect disabling or killing system.

3. A system as set forth in claim 2 wherein said at least one processor is further configured to use time of day or season to determine if said at least one airborne insect is to be disabled or killed.

4. A system as set forth in claim 2 wherein said at least one detector and said at least one processor are configured to support determination of intensity in one or more spectral bands or frequency bands of said detected electromagnetic energy.

5. A system as set forth in claim 2 wherein said at least one detector and said at least one processor are configured to support determination of wingbeat frequency of said at least one airborne insect.

6. A system as set forth in claim 1 further comprising at least one energy transmitter for transmitting electromagnetic detection energy toward said at least one airborne insect.

7. A system as set forth in claim 6 wherein said at least one energy transmitter, said at least one detector, and said at least one processor are configured to support determination for said at least one airborne insect of any of the group consisting of:
    direction to said at least one airborne insect from said airborne insect disabling or killing system,
    intensity in one or more spectral bands or frequency bands of said detected electromagnetic energy from said at least one airborne insect,
    time-varying intensity in one or more spectral bands or frequency bands of said detected electromagnetic energy from said at least one airborne insect,
    range to said at least one airborne insect,
    location of said at least one airborne insect,
    flight speed of said at least one airborne insect,
    wingbeat frequency of said at least one airborne insect,
    intensity at one or more polarization angles of said detected electromagnetic energy from said at least one airborne insect,
    Doppler-induced frequency shift of said detected electromagnetic energy scattered from said at least one airborne insect.

8. A system as set forth in claim 6 wherein said at least one energy transmitter further comprises any of the group consisting of:
    one or more LEDs,
    one or more vertical cavity surface emitting lasers (VCSEL),
    one or more radar transmitters,
    one or more ladar transmitters,
    one or more lidar transmitters,
    one or more laser transmitters,
    one or more incandescent light sources,
    one or more flashlamps.

9. A system as set forth in claim 1 wherein said at least one detector further comprises any of the group consisting of:
    a photo-diode,
    a photo-transistor,
    a charge-coupled device (CCD) array,
    a photo-multiplier tube,
    a CMOS focal plane,
    an infrared sensor, a microwave radiometer,
an RF signal detector,
a semi-conductor based electromagnetic energy detector.

10. A system as set forth in claim 2 wherein said airborne insect disabling or killing system further comprises any of the group consisting of:
a laser beam generator,
a high power microwave transmitter,
an unmanned aircraft.

11. A system as set forth in claim 7 wherein said airborne insect disabling or killing system further comprises an unmanned aircraft including at least one of the group consisting of:
a laser beam generator,
a projectile throwing device,
a pesticide sprayer,
a direct contact killing device.

12. A system as set forth in claim 7 wherein said at least one processor is configured to use at least one said determination from said group to determine whether said at least one airborne insect is to be engaged by said airborne insect disabling or killing system.

13. A system as set forth in claim 10 wherein a laser beam from said laser beam generator is limited in range to be non-injurious to non-targeted entities and consisting of at least one of the group comprising:
selection of wavelength of said laser beam so that said laser beam is attenuated by atmosphere,
using focusing optics so that said laser beam diverges to harmless levels beyond a targeted said airborne insect,
using a backstop to block said laser beam beyond said backstop.

14. A system for detecting and disabling or killing airborne insects comprising:
at least one detector of electromagnetic energy emitted from at least one airborne insect or scattered by said at least one airborne insect from at least one electromagnetic source, said at least one detector providing a detection signal representative of detected said electromagnetic energy from said at least one airborne insect,
at least one processor coupled to said at least one detector, said processor comprising at least one display responsive to said detection signal and a user interface that generates control signals based on observation of said at least one display, and,
an airborne insect disabling or killing system responsive to said control signals, wherein said at least one display indicates at least a direction to said at least one airborne insect from said airborne insect disabling or killing system.

15. A system as set forth in claim 14 wherein said airborne insect disabling or killing system further comprises at least one power beam generator, and wherein said control signals are used to develop at least pointing and firing commands for said at least one power beam generator.

16. A system as set forth in claim 15 wherein said at least one power beam generator is a laser beam generator or a high power microwave beam generator.

17. A system as set forth in claim 14 further comprising at least one energy transmitter for transmitting electromagnetic detection energy toward said at least one airborne insect.

18. A system as set forth in claim 17 wherein said at least one energy transmitter further comprises any of the group consisting of:
at least one LED,
at least one vertical cavity surface emitting laser (VCSEL),
at least one laser other than a vertical cavity surface emitting laser (VCSEL),
at least one radar transmitter,
at least one ladar transmitter,
at least one lidar transmitter,
at least one incandescent light source,
at least one flashlamp.

19. A system as set forth in claim 14 wherein said at least one detector further comprises any of the group consisting of:
at least one photo-diode,
at least one photo-transistor,
at least one charge-coupled device (CCD) array,
at least one photo-multiplier tube,
at least one CMOS focal plane,
at least one infrared sensor,
at least one microwave radiometer,
at least one semi-conductor based electromagnetic energy detector,
at least one RF receiver.

20. A system as set forth in claim 17 wherein said at least one energy transmitter, said at least one detector, and said at least one processor support determination and representation on said at least one display of any of the group consisting of:
direction to said at least one airborne insect from said airborne insect disabling or killing system,
intensity of said detected electromagnetic energy from said at least one airborne insect in one or more spectral bands or frequency bands,
time-varying intensity of said detected electromagnetic energy from said at least one airborne insect in one or more spectral bands or frequency bands,
range to said at least one airborne insect,
location of said at least one airborne insect,
flight speed of said at least one airborne insect,
wingbeat frequency of said at least one airborne insect,
intensity of said detected electromagnetic energy from said at least one airborne insect at one or more polarization angles,
Doppler-induced frequency shift of said detected electromagnetic energy scattered from said at least one airborne insect.

21. A system as set forth in claim 20 wherein said airborne insect disabling or killing system further comprises any of the group consisting of:
a laser beam generator,
a high power microwave device,
a remote control aircraft.

22. A system as set forth in claim 14 wherein said airborne insect disabling or killing system further comprises:
an unmanned aircraft responsive to said control signals,
a video camera mounted to said unmanned aircraft, and wherein a video stream from said video camera is coupled to said at least one display, and further wherein said unmanned aircraft further comprises any of the devices selected from the group consisting of:
at least one laser beam generator,
at least one projectile throwing device,
at least one pesticide sprayer,
at least one direct contact killing device.

23. A system as set forth in claim 22 wherein said at least one display is a head-mounted display.

* * * * *